(12) United States Patent
Goto et al.

(10) Patent No.: US 11,794,344 B2
(45) Date of Patent: Oct. 24, 2023

(54) ROBOT UTILIZATION SYSTEM AND TRANSPORT ROBOT

(71) Applicant: Toyota Jidosha Kabushiki Kaisha, Toyota (JP)

(72) Inventors: Jiro Goto, Seto (JP); Satoshi Okamoto, Nagoya (JP); Terumi Ukai, Toyokawa (JP); Tetsuya Taira, Nagakute (JP); Daisaku Honda, Kasugai (JP); Masato Endo, Chofu (JP); Takashi Hayashi, Nagoya (JP)

(73) Assignee: TOYOTA JIDOSHA KABUSHIKI KAISHA, Toyota Aichi-ken (JP)

( * ) Notice: Subject to any disclaimer, the term of this patent is extended or adjusted under 35 U.S.C. 154(b) by 218 days.

(21) Appl. No.: 17/066,648

(22) Filed: Oct. 9, 2020

(65) Prior Publication Data
US 2021/0107159 A1    Apr. 15, 2021

(30) Foreign Application Priority Data
Oct. 15, 2019   (JP) ................................ 2019-188879

(51) Int. Cl.
*B25J 9/16* (2006.01)
*B25J 13/00* (2006.01)

(52) U.S. Cl.
CPC ........... *B25J 9/1679* (2013.01); *B25J 9/1664* (2013.01); *B25J 13/006* (2013.01)

(58) Field of Classification Search
CPC ........ B25J 9/1679; B25J 5/007; B25J 9/1664; B25J 13/006; B25J 9/162; B25J 9/1656; B25J 11/0045; G06Q 30/06; G06Q 10/0837; G05D 1/021; G05D 1/0212; G05D 1/0225; G05D 1/0287; G05D 1/0291
See application file for complete search history.

(56) References Cited

U.S. PATENT DOCUMENTS

| | | | |
|---|---|---|---|
| 10,071,891 B2 * | 9/2018 | High | G01S 1/7038 |
| 11,099,562 B1 * | 8/2021 | Ebrahimi Afrouzi | G05D 1/0276 |
| 2018/0107978 A1 * | 4/2018 | Drey | G06Q 10/0837 |
| 2019/0035044 A1 * | 1/2019 | Ferguson | G05D 1/0295 |
| 2019/0377357 A1 * | 12/2019 | Lee | G05D 1/0088 |
| 2021/0090143 A1 * | 3/2021 | Chalkley | H04N 5/247 |

FOREIGN PATENT DOCUMENTS

| | | | | |
|---|---|---|---|---|
| CN | 110223464 B | * | 10/2021 | G07G 1/0045 |
| JP | 2008-087892 A | | 4/2008 | |
| WO | 2019049366 A1 | | 3/2019 | |

* cited by examiner

*Primary Examiner* — Abby Y Lin
*Assistant Examiner* — Esvinder Singh
(74) *Attorney, Agent, or Firm* — Dinsmore & Shohl LLP

(57) ABSTRACT

In a robot utilization system using a plurality of transport robots, the transport robot includes a traveling mechanism having a traveling function, a main body supported by the traveling mechanism and configured to receive products, and a specifying unit configured to specify the products received by the main body. The transport robots include a transport robot that performs a purchase process of the products received by the main body, and a transport robot that performs a return process of the products received by the main body.

3 Claims, 14 Drawing Sheets

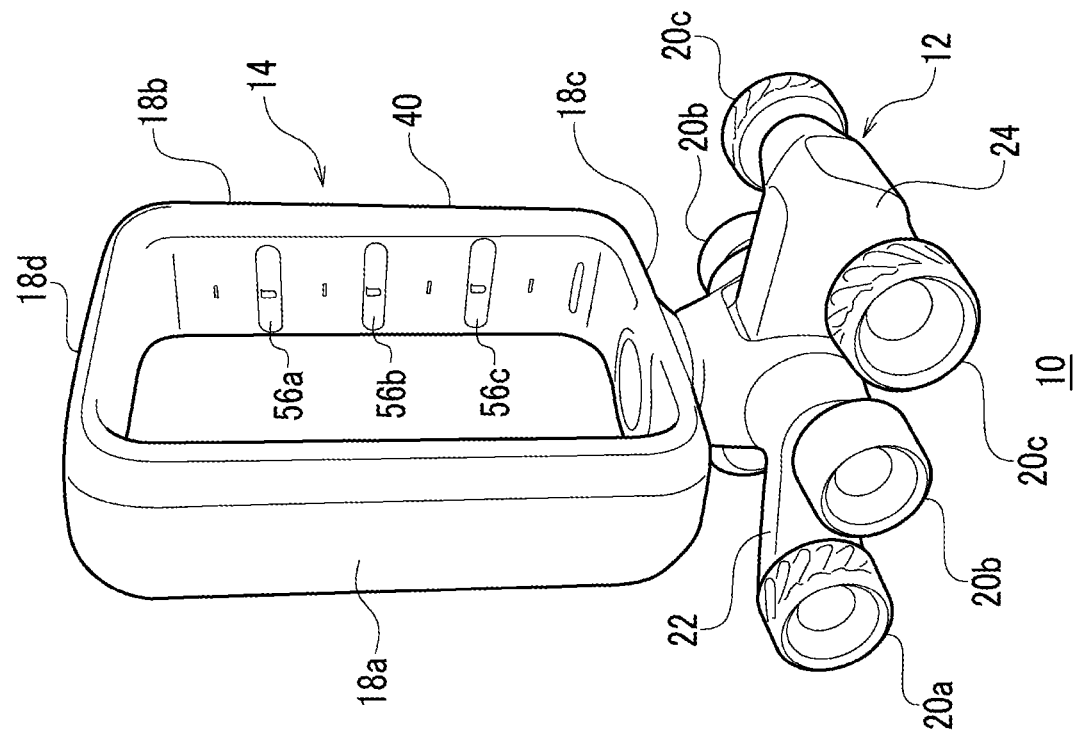
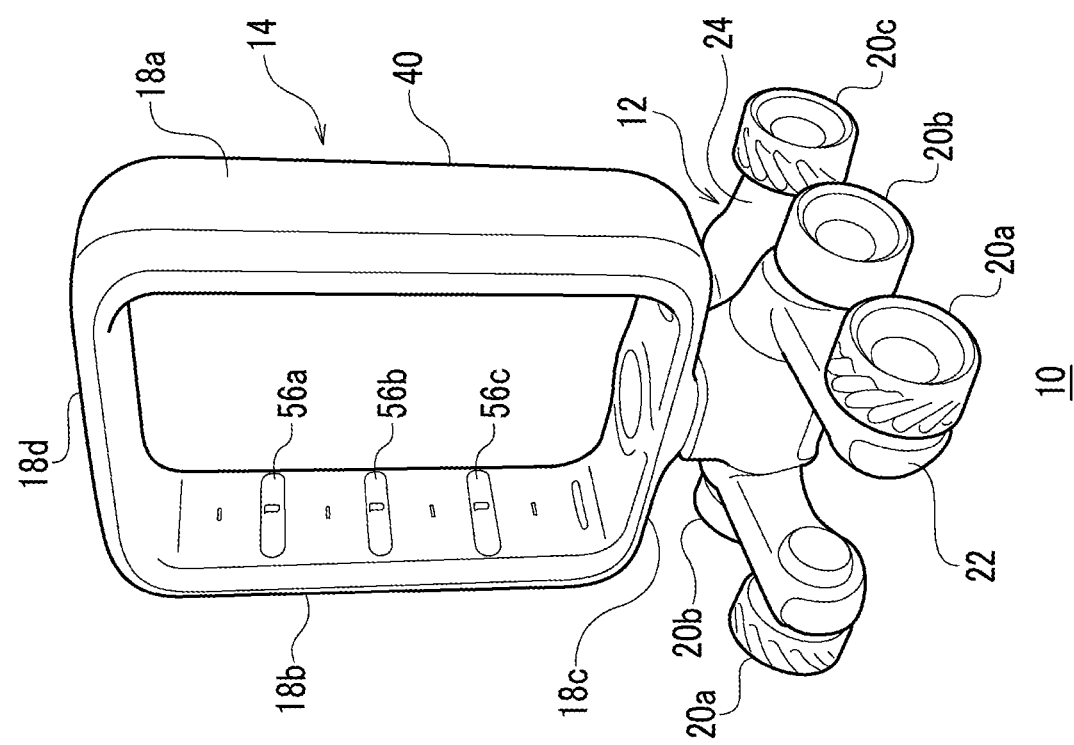

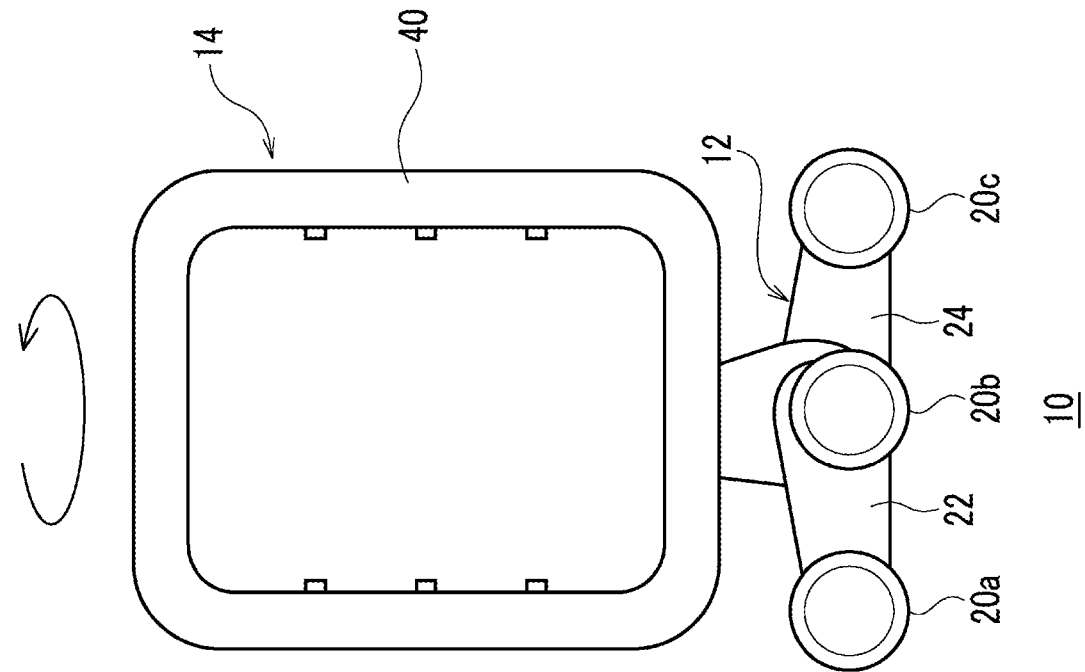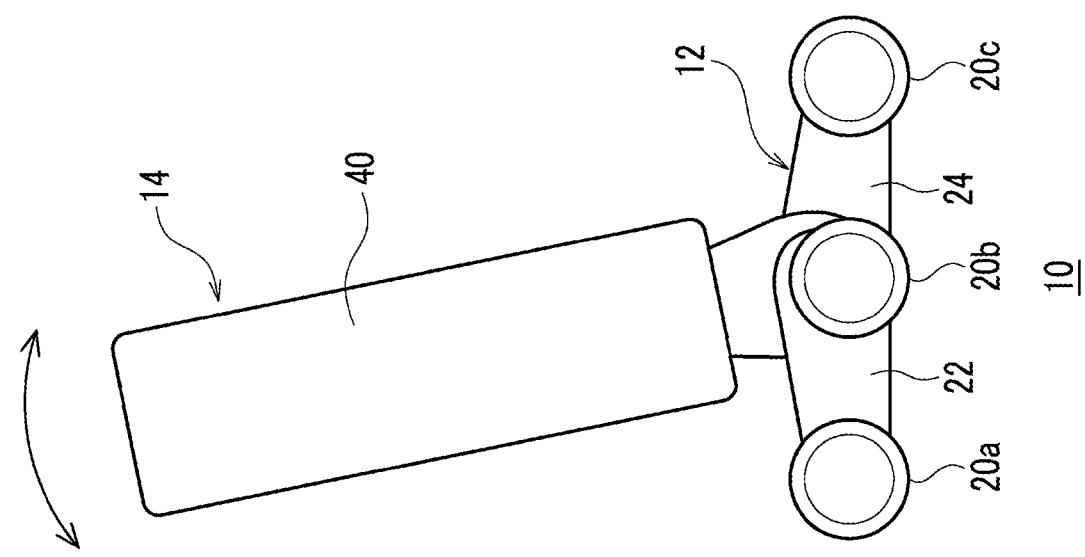

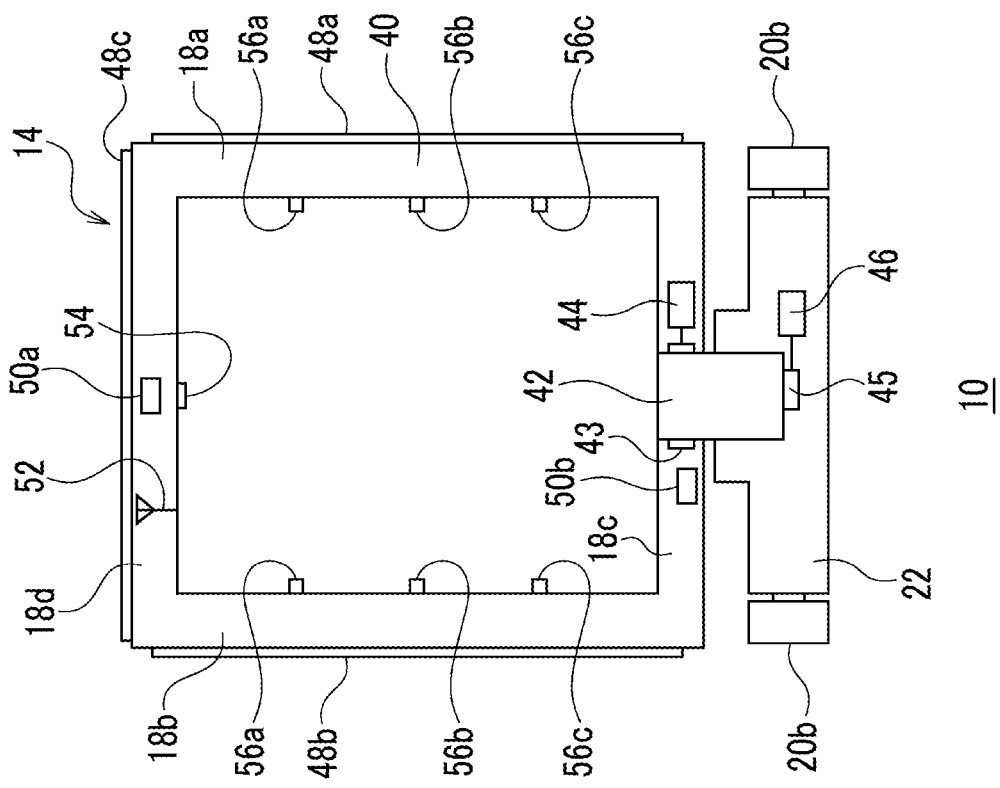
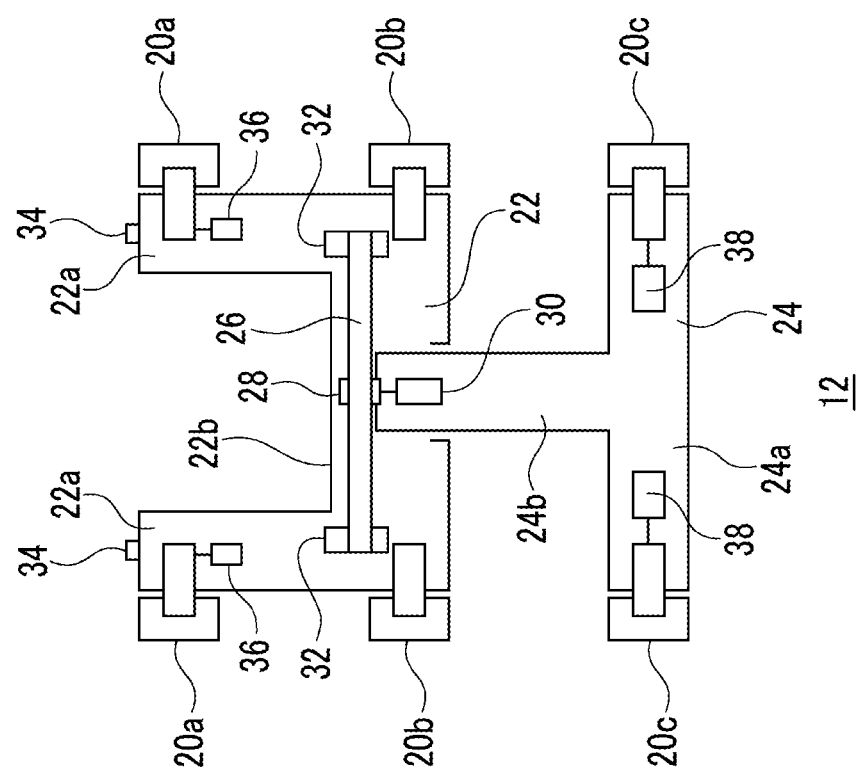
FIG. 5A
FIG. 5B

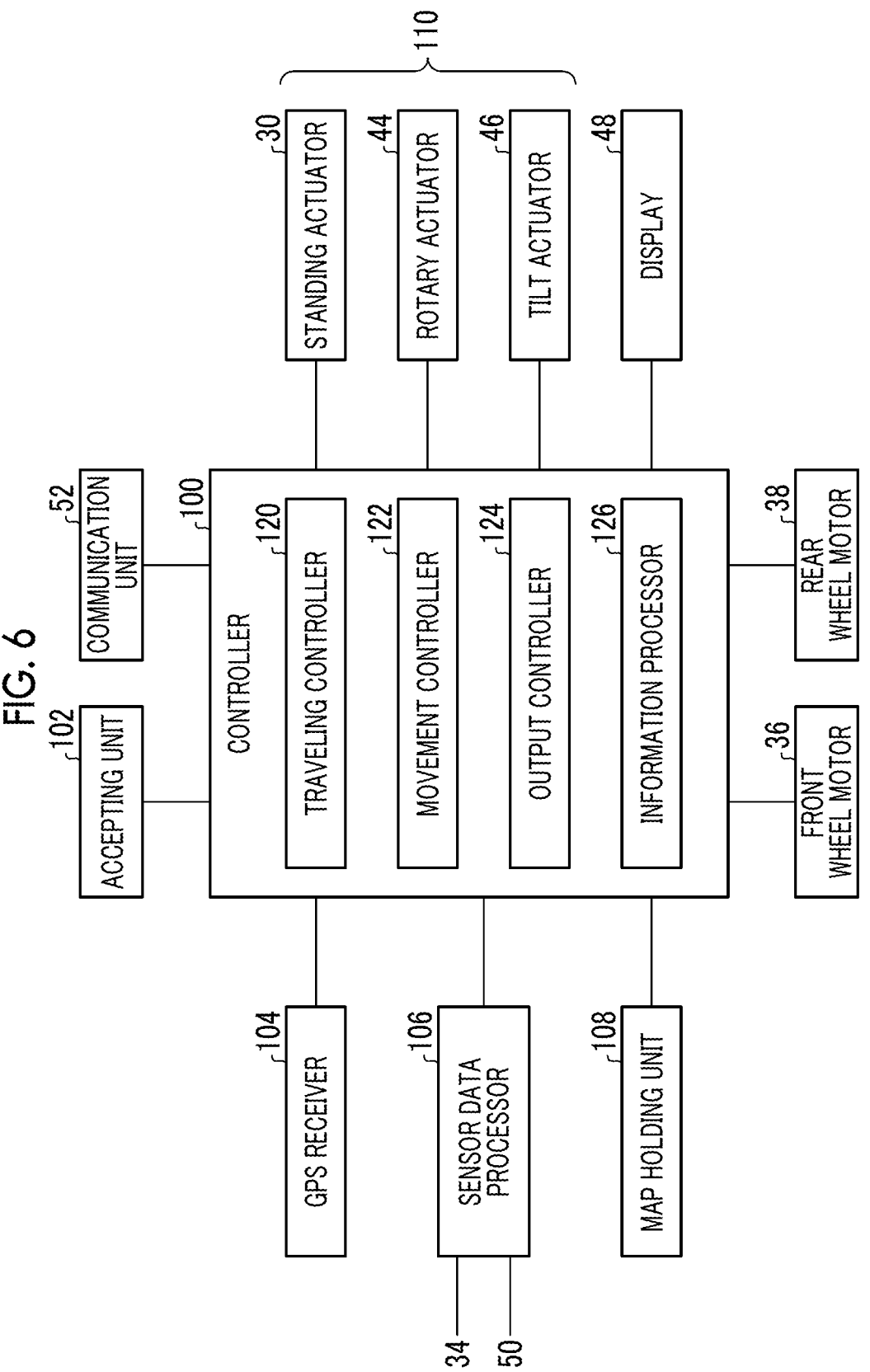

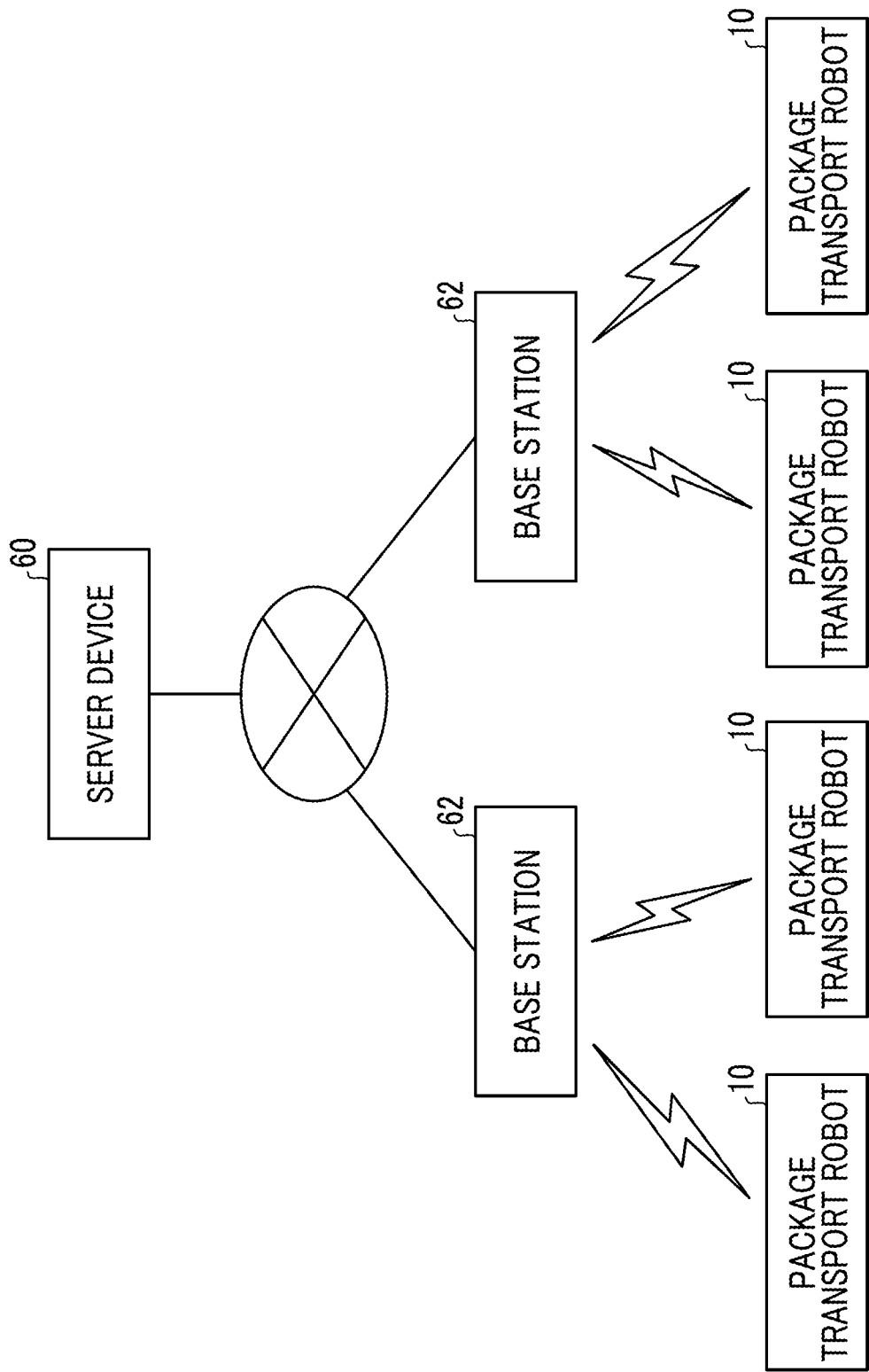

ROBOT UTILIZATION SYSTEM AND TRANSPORT ROBOT

CROSS-REFERENCE TO RELATED APPLICATION

This application claims priority to Japanese Patent Application No. 2019-188879 filed on Oct. 15, 2019, incorporated herein by reference in its entirety.

BACKGROUND

1. Technical Field

The disclosure relates to a technique using a transport robot having an autonomous traveling function.

2. Description of Related Art

WO 2019/49366 discloses an article transport robot including a bottom, a first column and a second column extending vertically from both ends of the bottom in a horizontal direction, and, respectively, an article storage portion in which an opening is formed by a top connected to respective upper ends of the first column and the second column, and fixing portions provided in a pair on the first column and the second column with the opening being interposed therebetween and fixing an article storage aid tool. In WO 2019/49366, a usage scene is assumed in which the article transport robot travels following a shopping user, and the user puts articles in and out of the article storage aid tool fixed to the opening of the article transport robot while the user is shopping.

SUMMARY

In the technology disclosed in WO 2019/49366, the user can easily purchase products by using the article transport robot, but when the user wants to return the products, and it may be troublesome for the user to return the products.

An object of the disclosure to provide a technology that allows products to be easily returned.

A first aspect of the disclosure relates to a robot utilization system that uses a plurality of transport robots. The transport robot includes a traveling mechanism configured to have a traveling function, a main body supported by the traveling mechanism and configured to receive products, and a specifying unit configured to specify the products received by the main body. The transport robots include a transport robot that performs purchase process on the products received by the main body and a transport robot that performs a return process on the products received by the main body.

A second aspect of the disclosure relates to a transport robot. The transport robot includes a traveling mechanism configured to have a traveling function, a main body supported by the traveling mechanism and configured to receive products to be returned, a specifying unit configured to specify the products received by the main body, and a traveling controller configured to control the traveling mechanism. The traveling controller is configured to cause the traveling mechanism to travel in a facility that sells the products, and to travel to reach a return location according to the product specified by the specifying unit.

According to the disclosure, the technique which can return products easily can be provided.

BRIEF DESCRIPTION OF THE DRAWINGS

Features, advantages, and technical and industrial significance of exemplary embodiments will be described below with reference to the accompanying drawings, in which like numerals denote like elements, and wherein:

FIGS. 1A and 1B are perspective views of a package transport robot according to an embodiment;

FIGS. 4A and 4B are diagrams illustrating a relative movement of a main body with respect to a traveling mechanism;

FIGS. 5A and 5B are diagrams illustrating a structure of the package transport robot;

FIG. 6 is a diagram illustrating functional blocks of the package transport robot;

FIG. 7 is a schematic diagram of an outline of a configuration of a robot control system;

DETAILED DESCRIPTION OF EMBODIMENTS

Figure 2A:
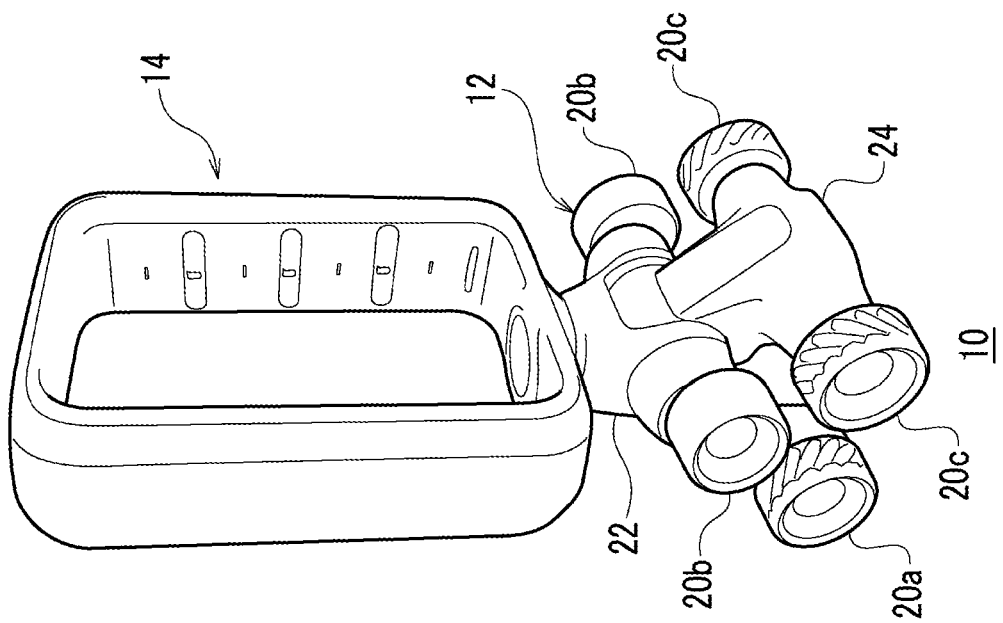
FIGS. 2A and 2B are perspective views of the package transport robot in an upright standing position.

FIGS. 1A and 1B are perspective views of a package transport robot 10 according to an embodiment. The height of the package transport robot 10 may be, for example, about 1 to 1.5 meters. The package transport robot 10 includes a traveling mechanism 12 having an autonomous traveling function, and a main body 14 which is supported by the traveling mechanism 12 and on which an object such as a package is loaded. The traveling mechanism 12 includes a first wheel body 22 and a second wheel body 24. The first wheel body 22 has a pair of front wheels 20a and a pair of middle wheels 20b, and the second wheel body 24 has a pair of rear wheels 20c. FIGS. 1A and 1B show a state in which the front wheels 20a, the middle wheels 20b, and the rear wheels 20c are arranged in a straight line.

The main body 14 has a frame body 40 formed in a rectangular shape, and a housing space for loading an object such as a package is formed inside the frame body 40. The frame body 40 includes a pair of right and left side walls 18a, 18b, a bottom plate 18c connecting the pair of side walls at a lower side, and an upper plate 18d connecting the pair of side walls at an upper side. A pair of projecting strip portions (ribs) 56a, 56b, 56c (hereinafter, referred to as "projecting strip portions 56" unless otherwise distinguished) facing each other are provided on the inner surfaces of the right side wall 18a and the left side wall 18b. The main body 14 is connected to the traveling mechanism 12 to be relatively movable. The package transport robot 10 according to the embodiment has a home delivery function of loading a package, autonomously traveling to a set destination, and delivering the package to a user waiting at the destination. Hereinafter, with respect to directions of the main body 14, a direction perpendicular to the opening of the frame body 40 in a state in which the main body 14 stands upright with respect to the traveling mechanism 12 is referred to as a "front-rear direction of the main body 14", and a direction perpendicular to a pair of side walls is referred to as a "right-left direction of the main body 14". In addition, with regard to directions of the traveling mechanism 12, a direction connecting the front wheel 20*a* and the rear wheel 20*c* is referred to as a "front-rear direction of the traveling mechanism 12", and a direction parallel to the rotation axis of the front wheel 20*a* is referred to as a "right-left direction of the traveling mechanism 12".

Figure 2B:
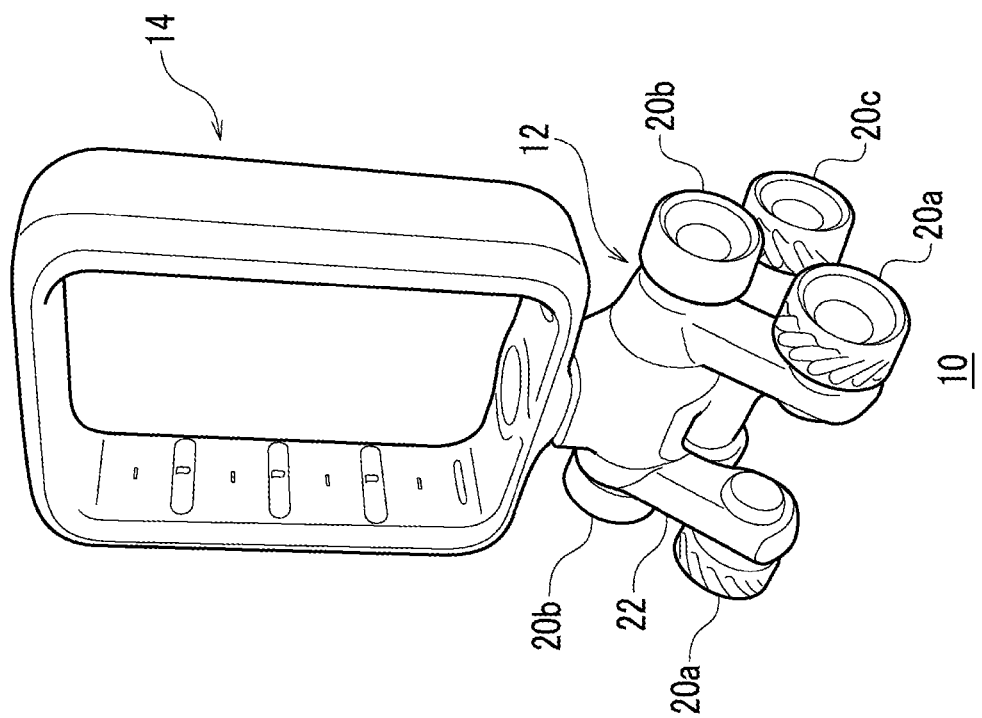

FIGS. 2A and 2B are perspective views of the package transport robot 10 in an upright standing position. The front wheels 20*a* and the rear wheels 20*c* in the traveling mechanism 12 gets close to each other, and the first wheel body 22 and the second wheel body 24 incline with respect to the ground contact surface, whereby the package transport robot 10 takes an upright standing position. For example, when the package transport robot 10 reaches a destination and takes the upright standing position in front of a user at the destination, the user can easily pick up the package loaded on the main body 14, which is destined for the user himself or herself.

Figure 3:
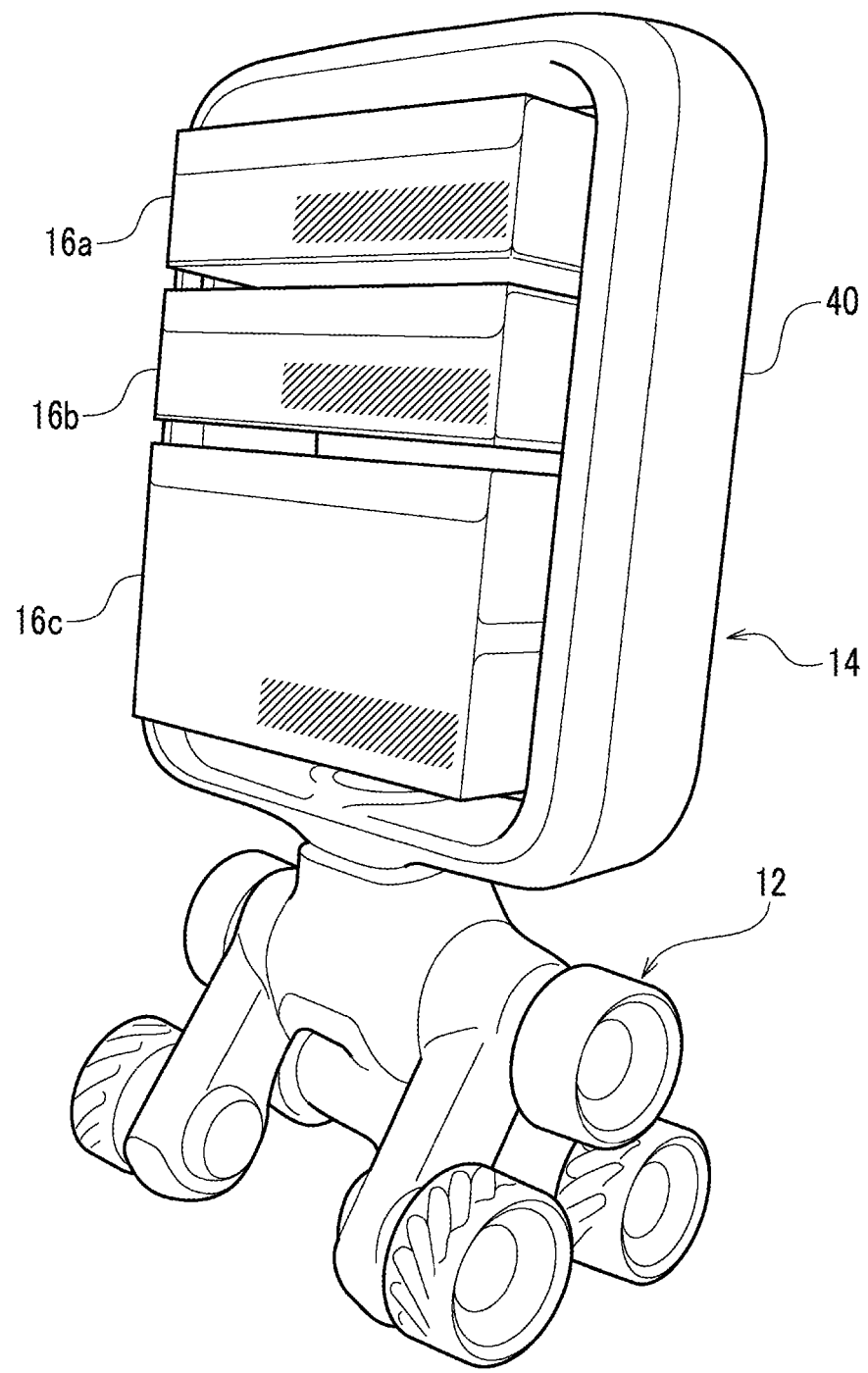
FIG. 3 is a perspective view of the package transport robot in the upright standing position with packages loaded.

FIG. 3 is a perspective view of the package transport robot 10 in the upright standing position with packages loaded. FIG. 3 shows a state where a first package 16*a*, a second package 16*b*, and a third package 16*c* are loaded on the main body 14. The first package 16*a*, the second package 16*b*, and the third package 16*c* are loaded on or engaged with the projecting strip portions 56 formed on the inner surfaces of the right side wall 18*a* and the left side wall 18*b*, thereby being loaded on the main body 14.

Although the first package 16*a*, the second package 16*b*, the third package 16*c* shown in FIG. 3 have a box shape, the object loaded on the main body 14 is not limited to the box shape. For example, a container for storing the object may be loaded on projecting strip portions 56, and the object may be put in the container. Further, a hook may be provided on the inner surface of an upper plate 18*d* of the frame body 40, the object may be put in a bag with a handle, and the handle of the bag may be hung on the hook to hang the bag.

In addition, various things other than packages can be housed in the housing space in the frame body 40. For example, by housing a refrigerator in the frame body 40, the package transport robot 10 can function as a movable refrigerator. Furthermore, by housing a product shelf on which products are mounted in the frame body 40, the package transport robot 10 can function as a moving store. By providing display devices on both sides of the opening of the frame body 40, the package transport robot 10 can function as a moving display.

FIGS. 4A and 4B are diagrams illustrating a relative movement of the main body 14 with respect to the traveling mechanism 12. FIG. 4A shows a state where the side wall of the frame body 40 is inclined with respect to the vertical direction. The frame body 40 is supported to be relatively rotatable by a connecting shaft extending in the right-left direction with respect to the traveling mechanism 12, and can be inclined in any of the front-rear directions. By alternately repeating the tilting motion in the front-rear direction, the frame body 40 can perform the rocking motion in the front-rear direction.

FIG. 4B shows a state in which the frame body 40 is rotated by about 90 degrees around a vertical axis. The frame body 40 is supported to be relatively rotatable by a connecting shaft extending in a direction normal to the traveling mechanism 12, and the frame body 40 rotates as shown in FIG. 4B since the frame body 40 and the traveling mechanism 12 rotates relatively to each other around the connecting shaft. The frame body 40 may be rotatable 360 degrees.

FIGS. 5A and 5B are diagrams illustrating a structure of the package transport robot 10. FIG. 5A shows the structure of the traveling mechanism 12, and FIG. 5B mainly shows the structure of the main body 14. Actually, a power supply and a controller are provided in the traveling mechanism 12 and the main body 14, but are omitted in FIGS. 5A and 5B.

As shown in FIG. 5A, the traveling mechanism 12 includes front wheels 20*a*, middle wheels 20*b*, rear wheels 20*c*, a first wheel body 22, a second wheel body 24, a shaft 26, a coupling gear 28, a standing actuator 30, shaft supports 32, object detection sensors 34, front wheel motors 36 and rear wheel motors 38.

The first wheel body 22 has a pair of side members 22*a* and a cross member 22*b* connecting the pair of side members 22*a* and extending in the vehicle width direction. The side members 22*a* are provided to extend vertically from both ends of the cross member 22*b*. The pair of front wheels 20*a* is provided at the positions of the front ends of the pair of side members 22*a*, respectively, and the pair of middle wheels 20*b* is provided at the positions of both ends of the cross member 22*b*. A front wheel motor 36 that rotates a wheel shaft is provided on each of the front wheels 20*a*.

The second wheel body 24 has a cross member 24*a* extending in the vehicle width direction, and a connecting member 24*b* extending from a center position of the cross member 24*a* in a normal direction. The connecting member 24*b* is inserted into the cross member 22*b* of the first wheel body 22, and is connected to the first wheel body 22 to be relatively rotatable. The rear wheels 20*c* are provided at both ends of the cross member 24*a*, respectively.

The rear wheel motors 38 for rotating a wheel shaft is provided on the rear wheels 20*c*, respectively. The front wheels 20*a* and the rear wheels 20*c* can be independently rotated by the respective motors, and the traveling mechanism 12 can turn right or left depending on the difference in the amount of rotation between the right and left wheels.

The shaft 26 extending in the vehicle width direction and the shaft supports 32 for supporting both ends of the shaft 26 are provided inside the cross member 22*b*. The connecting member 24*b* of the second wheel body 24 is rotatably connected to the shaft 26 by the coupling gear 28. The standing actuator 30 can rotate the connecting member 24*b* around the shaft 26. The first wheel body 22 and the second wheel body 24 can be relatively rotated by the driving of the standing actuator 30 to take the upright standing position shown in FIGS. 2A and 2B and to return to the horizontal position shown in FIGS. 1A and 1B from the upright standing position.

The traveling mechanism 12 has a rocker bogie structure capable of traveling on a step on a road or the like. The shaft 26 that connects the first wheel body 22 and the second wheel body 24 is offset from the wheel shaft of the middle wheels 20*b*, and is positioned between the wheel shaft of the front wheels 20*a* and the wheel shaft of the middle wheels 20*b* in a direction perpendicular to the vehicle width. Thus, the first wheel body 22 and the second wheel body 24 can be bent to the road surface shape during traveling, with reference to the shaft 26 as a supporting point.

The object detection sensors 34 are provided on the first wheel body 22 and detect objects in the traveling direction. The object detection sensor 34 may be a millimeter wave radar, an infrared laser, a sound wave sensor, or the like, or may be a combination thereof. The object detection sensor 34 may be provided at various positions on the first wheel body 22 and the second wheel body 24 to make a detection of a rearward or lateral object, in addition to the front portion of the first wheel body 22.

As shown in FIG. 5B, the package transport robot 10 includes the frame body 40, the connecting shaft 42, outer peripheral teeth 43, a rotary actuator 44, a connecting shaft 45, a tilt actuator 46, a first camera 50a, a second camera 50b, and a communication unit 52. In the frame body 40, displays 48a, 48b, 48c (hereinafter, referred to as "displays 48" unless otherwise distinguished), a hook 54, the first projecting strip portions 56a, the second projecting strip portions 56b, and the projecting strip portions 56c are provided. For convenience of description, in FIG. 5B, the connecting shaft 42, the outer peripheral teeth 43, the rotary actuator 44, the connecting shaft 45, and the tilt actuator 46 are simplified and integrally shown. However, the connecting shaft 42, the outer peripheral teeth 43, and the rotary actuator 44 may be provided separately from the connecting shaft 45 and the tilt actuator 46.

The projecting strip portions 56 are provided to project out from the inner surfaces of the right side wall 18a and the left side wall 18b to load a package or the like. The hook 54 for hanging a package is formed on the inner surface of the upper plate 18d of the frame body 40. The hook 54 may always be exposed from the inner surface of the upper plate of the frame body 40, but may be provided to be housed in the inner surface of the upper plate such that the hooks 54 can be taken out as necessary.

The displays 48a, 48b are provided on outer surfaces of the right side wall 18a and the left side wall 18b, respectively, and the display 48c is provided on an outer surface of the upper plate 18d, which can display images. The bottom plate 18c and the upper plate 18d are provided with a first camera 50a and a second camera 50b (referred to as "camera 50" unless otherwise distinguished). It is desirable that the package transport robot 10 is mounted with a camera in addition to the first camera 50a and the second camera 50b to monitor all surrounding conditions. The camera 50 may be provided at a position where an image of the housing space of the frame body 40 are captured. The communication unit 52 is further provided on the upper plate 18d, and the communication unit 52 can communicate with an external server device through a wireless communication network.

The bottom plate 18c is rotatably attached to the outer peripheral teeth 43 of the connecting shaft 42 through a gear (not shown) on the rotary actuator 44, and is connected to the first wheel body 22 by the connecting shaft 42. The rotary actuator 44 rotates the frame body 40 to the connecting shaft 42 by relatively rotating the outer peripheral teeth 43 and the gear. As shown in FIG. 4B, the rotary actuator 44 allows the frame body 40 to be rotated.

The tilt actuator 46 rotates the connecting shaft 45 such that the connecting shaft 42 is inclined with respect to the vertical direction. The connecting shaft 45 extending in the right-left direction is provided integrally with the lower end of the connecting shaft 42, and the tilt actuator 46 rotates the connecting shaft 45 to implement the tilting motion of the connecting shaft 42. By tilting the connecting shaft 42, the tilt actuator 46 can tilt the frame body 40 in the front-rear direction as shown in FIG. 4A.

FIG. 6 shows functional blocks of the package transport robot 10. The package transport robot 10 includes a controller 100, an accepting unit 102, a communication unit 52, a global positioning system (GPS) receiver 104, a sensor data processor 106, a map holding unit 108, an actuator mechanism 110, a display 48, front wheel motors 36, and a rear wheel motors 38. The controller 100 includes a traveling controller 120, a movement controller 122, an output controller 124, and an information processor 126, and the actuator mechanism 110 includes the standing actuator 30, a rotary actuator 44, and a tilt actuator 46. The communication unit 52 has a wireless communication function, can communicate with a communication unit of another package transport robot 10 from vehicle to vehicle, and can receive information transmitted from a portable terminal device such as a smartphone of a user. The GPS receiver 104 detects a current position based on a signal from a satellite.

In FIG. 6, each of the elements described as functional blocks that perform various processes may be configured to include a circuit block, a memory, or another LSI in terms of hardware, and is implemented by a program, or the like loaded into the memory in terms of software. Therefore, it is to be understood by those skilled in the art that these functional blocks can be implemented in various forms by hardware, software, or a combination thereof, and the disclosure is not limited thereto. Furthermore, the drawings of the functional blocks to be described later are the same as those in FIG. 6.

The map holding unit 108 holds map information indicating a road position. The map holding unit 108 may hold not only the road position but also map information indicating a passage position on each floor in a multi-story building such as a commercial facility. As will be described later, the package transport robot 10 of the embodiment travels autonomously to follow a user shopping at a commercial facility. Therefore, it is desirable that the map holding unit 108 holds the map information of the commercial facility.

The package transport robot 10 has a plurality of action modes, and acts in the set action mode. Among the action modes, the basic action mode is an action mode in which the robot autonomously travels to a destination and delivers a package to a user waiting at the destination. Hereinafter, the basic action mode of the package transport robot 10 will be described.

Basic Action of Package Transport Robot 10

The package transport robot 10 is waiting at a pick-up site, and when a staff member at the pick-up site inputs a delivery destination, the package transport robot 10 travels autonomously to the input delivery destination. The traveling route may be determined by the package transport robot 10, or may be set by an external server device. The input of the delivery destination is performed by a predetermined wireless input tool, and when the staff member inputs the delivery destination from the wireless input tool, the communication unit 52 receives the delivery destination and notifies the traveling controller 120 of the delivery destination. The wireless input tool may be a dedicated remote controller, or may be a smartphone on which a dedicated application is installed.

The package transport robot 10 includes an interface for inputting a delivery destination, and the staff member may input the delivery destination from the interface. For example, when the display 48 is a display having a touch panel, the output controller 124 may display a delivery destination input screen on the display 48, and the staff member may input a delivery destination from the delivery destination input screen. When the accepting unit 102 accepts the touch operation on the touch panel, the information processor 126 specifies the delivery destination from the touch position and notifies the traveling controller 120. When the staff member at the pick-up site loads the package on the frame body 40 and inputs the delivery destination, and then instructs the package transport robot 10 to start the delivery, the traveling controller 120 starts autonomous traveling to the set delivery destination. The staff member may set a plurality of delivery destinations and load the package for each delivery destination in the housing space of the frame body 40.

The frame body 40 is provided with a mechanism for locking (fixing) the loaded package to the frame body 40. While the package transport robot 10 is traveling, the package is fixed to the frame body 40 by the lock mechanism. In this way, the package does not drop during traveling and is not removed by a third party who is not the recipient.

The traveling controller 120 controls the traveling mechanism 12 to travel on the set traveling route by using the map information held in the map holding unit 108 and the current position information supplied from the GPS receiver 104. Specifically, the traveling controller 120 drives the front wheel motors 36 and the rear wheel motors 38 to cause the package transport robot 10 to travel to the destination.

The sensor data processor 106 acquires information on objects existing around the package transport robot 10 based on the detection data by the object detection sensor 34 and the image captured by the camera 50, and provides the information to the traveling controller 120. The target object includes a static object, such as a structure or a gutter, that hinders traveling, and an object (movable object) that can move, such as a person or another package transport robot 10. The traveling controller 120 determines a traveling direction and a traveling speed to avoid collision with another object, and controls driving of the front wheel motors 36 and the rear wheel motors 38.

When the package transport robot 10 reaches the destination where the user who is the recipient is, the traveling controller 120 stops driving the motors. The user has previously acquired a passcode for unlocking the package destined for the user from an external server device. When the user transmits the passcode to the package transport robot 10 using a portable terminal device such as a smartphone, the communication unit 52 receives the passcode for unlocking, and the information processor 126 unlocks the package. At this time, the movement controller 122 drives the standing actuator 30 to cause the package transport robot 10 to take an upright standing position. In this way, the user recognizes that the package can be received, and can easily pick up the package loaded on the main body 14, which is destined for the user himself or herself. When the package is received by the user, the traveling controller 120 travels autonomously to the next destination.

The basic action mode of the package transport robot 10 has been described above, but the package transport robot 10 can also perform actions in other action modes. There are various action modes of the package transport robot 10, and a program for implement each action mode may be preinstalled. The user using the package transport robot 10 sets package transport robot 10 as a desired action mode before using the package transport robot 10, and the package transport robot 10 acts in the set action mode. Hereinafter, the "shopping support action mode" in which the package transport robot 10 supports the shopping of the user will be described.

The package transport robots 10 acting in the shopping support action mode are disposed at various locations in a commercial facility and wait for a use request from a user. In this mode, the package transport robot 10 acts as a so-called "package holder" of the user. A user who wishes to use the robot registers his or her shape with the package transport robot 10 and causes the package transport robot 10 to recognize that the robot has to follow the user. The package transport robot 10 may be set to capture the image of the whole body of the user with the camera 50 and extract the characteristic data such that the user can be distinguished from other users by image analysis. It is noted that the user may have a transmitter that transmits a predetermined beacon signal such that the package transport robot 10 can recognize the target to be followed. In any case, in the shopping support action mode, the package transport robot 10 needs to be able to follow the user, and the way to follow does not matter.

By loading the shopping basket inside the frame body 40 of the package transport robot 10, the user can put the product to be purchased or the purchased product into the shopping basket. This eliminates the need for the user to have a heavy shopping basket. Further, the transport robot 10 may specify a product loaded inside the frame body 40 and execute the purchase payment process of the product. This eliminates the need for the user to line up at the cash register.

FIG. 7 is a schematic diagram of an outline of a configuration of the robot control system 1. The robot control system 1 includes the package transport robot 10, a server device 60, and a base station 62. The server device 60 and the base station 62 may be connected through a network such as the Internet. The communication unit 52 of the package transport robot 10 has a wireless communication function, and connects to the server device 60 via the base station 62.

The number of the package transport robots 10 is not limited to four, and any robot control system 1 may be acceptable in which a number of package transport robots 10 exchange information with the server device 60. The server device 60 is installed in a data center and manages the traveling and arrangement of the package transport robots 10.

First Embodiment

Figure 8:
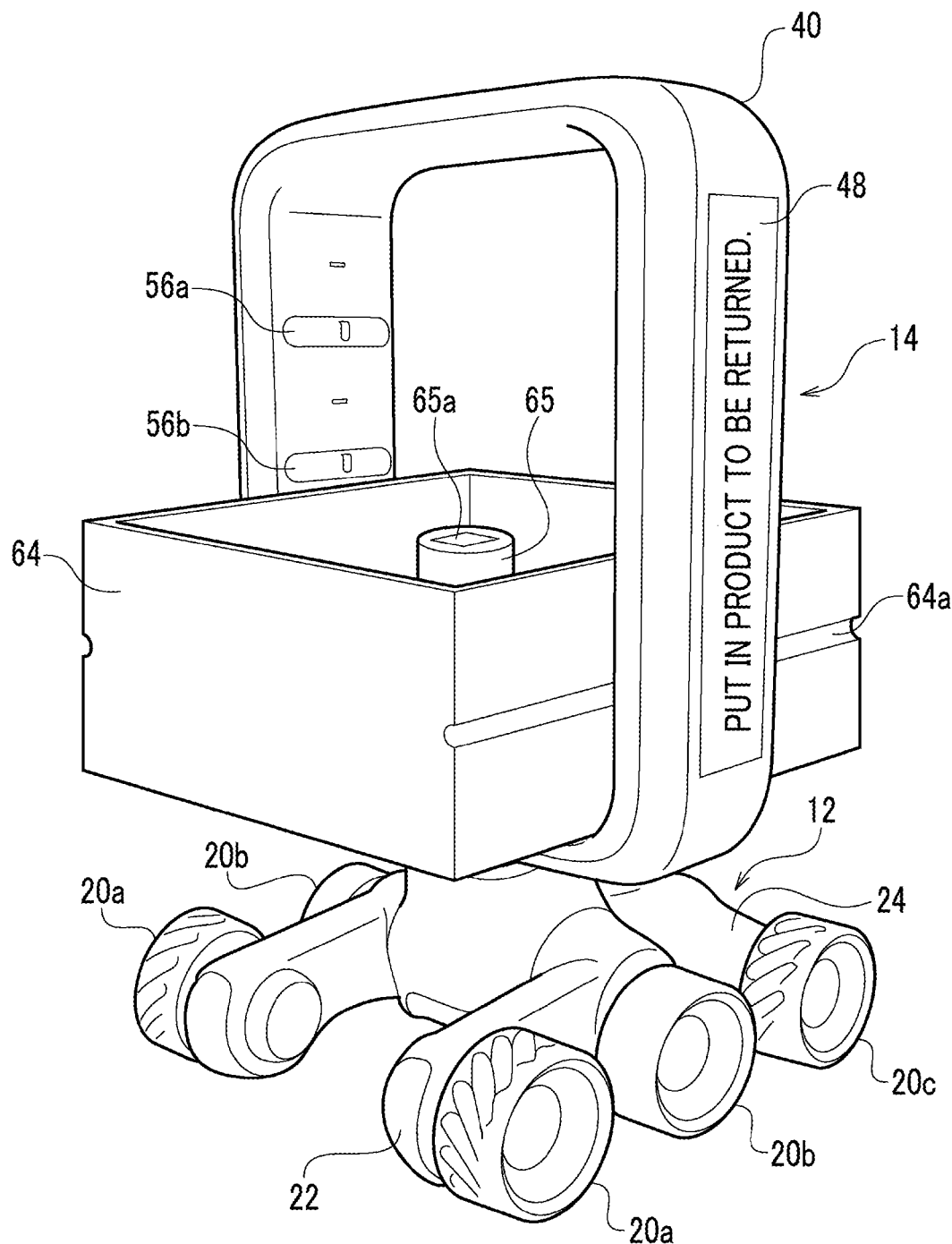
FIG. 8 is a perspective view of a package transport robot of a first embodiment.

FIG. 8 is a perspective view of a package transport robot 10 of a first embodiment. The package transport robot 10 shown in FIG. 8 has a box 64 provided in a main body 14, and the box 64 is held in the main body 14 by engaging with projecting strip portions 56 in a state of being inserted through a frame body 40. A groove that engages with the projecting strip portions 56 may be formed on the side of the box 64.

The package transport robot 10 travels in a commercial facility such as a supermarket, a shopping center, or a department store, and accepts a return of a product 65 from the user. The main body 14 receives the product 65 to be returned in the box 64. The box 64 functions as a receiving unit that receives the product 65 to be returned. The product 65 is provided with an IC tag 65a storing a product ID.

For example, a user may take the product 65 at a supermarket, but want to return the product 65 afterwards when the user moves inside the store. The package transport robot 10 can receive the product 65 returned from the user in the box 64, recognize the product 65, move to a return location corresponding to the product 65, and return the product 65.

In addition, the user may use a transport robot 10 for return process while using the transport robot 10 in the shopping support action mode. For example, the transport robot 10 in the shopping support action mode follows the user and executes a purchase payment process on the product 65 received from the user. The user can easily purchase the product 65 by passing the product 65 to the transport robot 10 in the shopping support action mode, but can return the product 65 by passing the purchased product 65 to the transport robot 10 for return. The transport robot 10 for return receives the purchased product 65 and executes a return/refund process. With this use system, the user can easily purchase and return a product.

Figure 9:
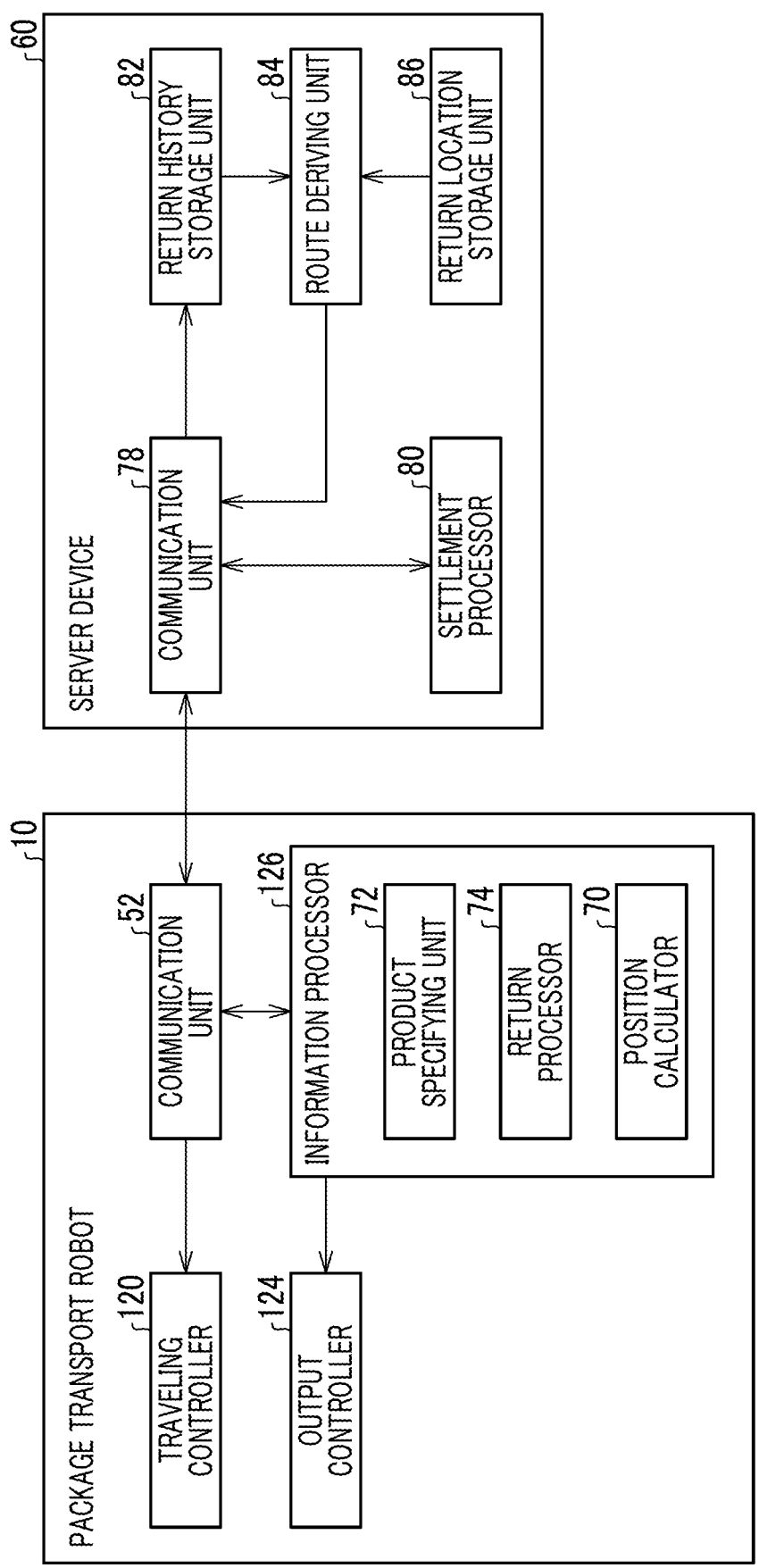
FIG. 9 is a diagram of functional blocks of the robot control system.

FIG. 9 shows functional blocks of the robot control system 1. The package transport robot 10 includes a communication unit 52, a traveling controller 120, an output controller 124, and an information processor 126. The information processor 126 includes a position calculator 70, a product specifying unit 72, and a return processor 74.

The communication unit 52 can communicate with the server device 60, and when transmitting information, transmits information with the robot ID of the package transport robot 10. The communication unit 52 includes a receiving unit capable of near-field communication, and receives the product ID from the IC tag 65a attached to the product 65 by the near-field communication. The near-field communication used by the communication unit 52 may be capable of receiving data within a range of several centimeters.

The communication unit 52 acquires the movement route of the package transport robot 10 from the server device 60 and transmits the acquired movement route to the traveling controller 120. The position calculator 70 calculates position information of the package transport robot 10 based on the GPS information. A time stamp is attached to the calculated position information.

The traveling controller 120 controls the traveling of the package transport robot 10 according to the movement route information received from the server device 60. The traveling controller 120 can stop or bypass the package transport robot 10 based on the obstacle information detected by the camera 50 and the object detection sensor 34.

The product specifying unit 72 specifies the product 65 loaded on the box 64. When the user brings the IC tag 65a closer to the communication unit 52, the communication unit 52 receives the product ID. The product specifying unit 72 specifies the product 65 loaded on the box 64 by the product ID. Further, the product specifying unit 72 may specify the product 65 based on the image captured by the camera 50. The product specifying unit 72 transmits information on the specified product 65 to the return processor 74.

The return processor 74 executes a return process of the product 65. The return processor 74 transmits the product ID of the returned product 65 to the server device 60, causes the server device 60 to execute the return/refund process, and receives the result of the return/refund process from the server device 60. The return processor 74 generates information indicating the result of the return process to the user who has loaded the product 65 on the box 64.

The output controller 124 notifies the user of the result of the return process. The output controller 124 may notify the user by displaying the result of the return process on the display 48. Further, the output controller 124 may notify the user by outputting sound from a speaker (not shown) provided in the main body 14.

The server device 60 includes a communication unit 78, a settlement processor 80, a return history storage unit 82, a route deriving unit 84, and a return location storage unit 86. The communication unit 78 receives position information and return information from the package transport robots 10, and transmits movement route information and payment information.

The settlement processor 80 executes a settlement process for the returned product 65. The settlement processor 80 may hold the user's credit card registration information. The settlement processor 80 receives the product ID and executes a process of canceling the purchase. The settlement processor 80 may send, for example, instruction information for canceling the purchase of the product 65 to the settlement server, and receive the settlement result from the settlement server. The settlement processor 80 sends the result of the return process of the product 65 corresponding to the product ID to the package transport robot 10.

The return history storage unit 82 stores return data transmitted from the package transport robot 10. The return data includes the product ID, the time when the product 65 is received, and the position information of the transport robot 10 that have received the product 65. Based on the return data stored in the return history storage unit 82, the server device 60 can calculate a location where the return frequency is high.

The return location storage unit 86 holds the position information of the return location of the returned product. A plurality of return locations may be set in the same retail store, or may be set for each retail store. Further, a return location may be set for each type of product such as fresh food, food excluding fresh food, clothing, and miscellaneous products. In any case, the return location storage unit 86 stores data indicating the relationship between the product and the return location.

The route deriving unit 84 derives a movement route of the package transport robot 10 based on map information, the position information of the package transport robot 10, and the return history storage unit 82. The route deriving unit 84 derives a movement route before collecting the product and a movement route after collecting the product. The route deriving unit 84 derives the movement route with regard to the package transport robot 10 before collecting the product, based on the return data stored in the return history storage unit 82, that is, the position information of the package transport robot 10 when the product 65 is received. The traveling controller 120 causes the transport robot 10 to travel along the movement route derived based on the position information of the transport robot 10 when the main body 14 receives the product 65 to be returned. Accordingly, it is possible to move the package transport robot 10 to a location where the product 65 is likely to be returned.

The route deriving unit 84 derives the movement route of the package transport robot 10 after collecting the product 65, based on the position information of the package transport robot 10 and the return location stored in the return location storage unit 86. The route deriving unit 84 derives a traveling route for allowing the package transport robot 10 to move to a return location according to the product ID. The configuration of the route deriving unit 84 that generates the movement route may be provided in the package transport robot 10.

The communication unit 78 transmits the movement route of the package transport robot 10 derived by the route deriving unit 84 to the package transport robot 10, and the traveling controller 120 controls traveling of the package transport robot 10 based on the derived movement route. The traveling controller 120 may cause the package transport robot 10 to circulate along the movement route.

The traveling controller 120 causes the returned product 65 to be delivered to the return location by traveling along the movement route derived by the route deriving unit 84. In this way, the product 65 can be collected at a predetermined return location. In addition, the traveling controller 120 causes the product 65 to return to a return location corresponding to the type of the product 65 specified by the product specifying unit 72. In this way, the product 65 can be transported to an appropriate return location.

The route deriving unit 84 may derive the movement route of the package transport robot 10 based on the behavior information of a customer who is in the movement range of the package transport robot 10. For example, the route deriving unit 84 may derive a movement route through which the package transport robot 10 passes a location where there are relatively many customers. The route deriving unit 84 may acquire the behavior information of the customer by analyzing the image captured by the fixed camera, or may acquire the purchase history of the customer from another server device as the behavior information of the customer. The route deriving unit 84 may learn the behavior of the customer who has a high possibility of returning the product based on the behavior information and the data on return of the customer.

The transport robot 10 for returning the product shown in the first embodiment and the transport robot 10 in the shopping support action mode may be mixed in the same commercial facility. The transport robot 10 in the shopping support action mode has a product settlement function, and the purchase of the product is canceled by transferring the product that has been held by the transport robot 10 in the shopping support action mode to the transport robot 10 for returning the product. In this way, by using the transport robots 10 for purchase and return, it is possible to easily purchase products without lining up at the cash register, and to easily return products.

When the product ID loaded on the transport robot 10 in the shopping support action mode satisfies a predetermined condition, the transport robot 10 for returning the product may approach the transport robot 10 in the shopping support action mode. For example, when the product ID loaded on the transport robot 10 in the shopping support action mode indicates that there is a high possibility of return, the transport robot 10 for returning the product approaches the transport robot 10 in the shopping support action mode. The predetermined condition is a condition for estimating that the possibility of return is high, and may be satisfied, for example, when the same product IDs are detected more than once, that is, when the same product ID is detected at or above a predetermined threshold (excluding one). As described above, the route deriving unit 84 of the server device 60 derives a movement route that causes the transport robot 10 for returning the product to approach the transport robot 10 in the shopping support action mode based on the purchase history of the user.

Figure 10:
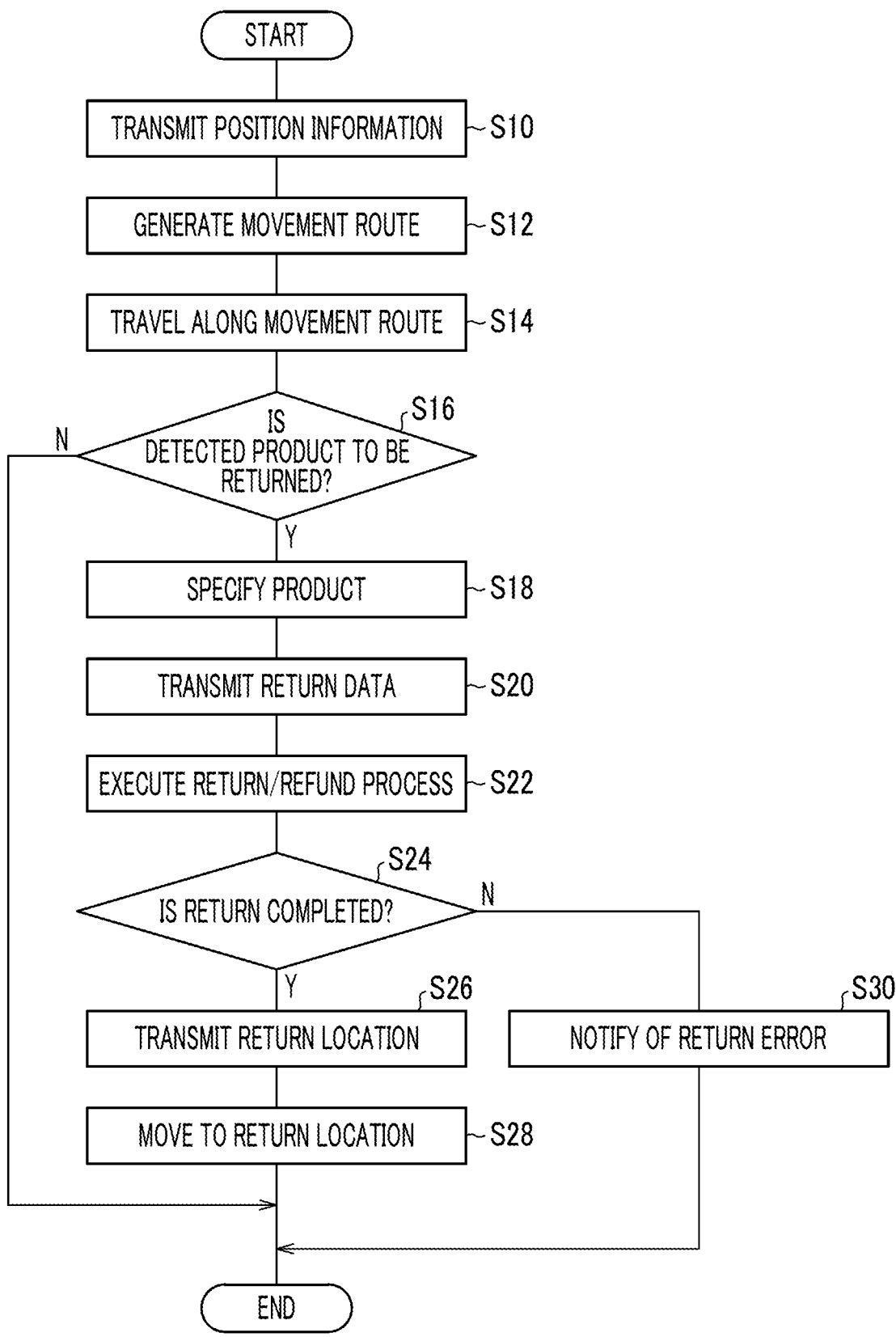
FIG. 10 is a flowchart of a process of collecting products by the package transport robot.

FIG. 10 is a flowchart of a process of collecting products by the package transport robot 10. The package transport robot 10 transmits the position information of the package transport robot 10 to the server device 60 (S10). The route deriving unit 84 derives the movement route of the package transport robot 10 based on the position information of the package transport robot 10 and the data on return which is stored in the return history storage unit 82 (S12), and sends the movement route to the package transport robot 10.

The traveling controller 120 of the package transport robot 10 causes the package transport robot 10 to travel along the derived movement route (S14). When the package transport robot 10 does not receive the product to be returned (N in S16), the process ends. When the package transport robot 10 receives the product to be returned (Y in S16), the product specifying unit 72 specifies the product to be returned (S18).

The return processor 74 sends, to the server device 60, the specified product ID and the position information of the package transport robot 10 when the product is received, as return data (S20). The settlement processor 80 executes a return/refund process (S22). The settlement processor 80 transmits the product ID and instruction information for canceling the purchase of the produce to the settlement server device, and receives a return result from the settlement server device.

When the return of the product is completed (Y in S24), the communication unit 78 transmits, to the package transport robot 10, the settlement completion information indicating that the return of the product is completed and the movement route information to the return location derived by the route deriving unit 84 (S26). The traveling controller 120 causes the package transport robot 10 to travel to a return location according to the product (S28).

When the return of the product is not completed (N in S24), the communication unit 78 transmits, to the package transport robot 10, settlement error information indicating that the return of the product is not completed, and the output controller 124 displays on the display 48 that the return of the product is not completed to notify the user (S30).

Second Embodiment

Figure 11:
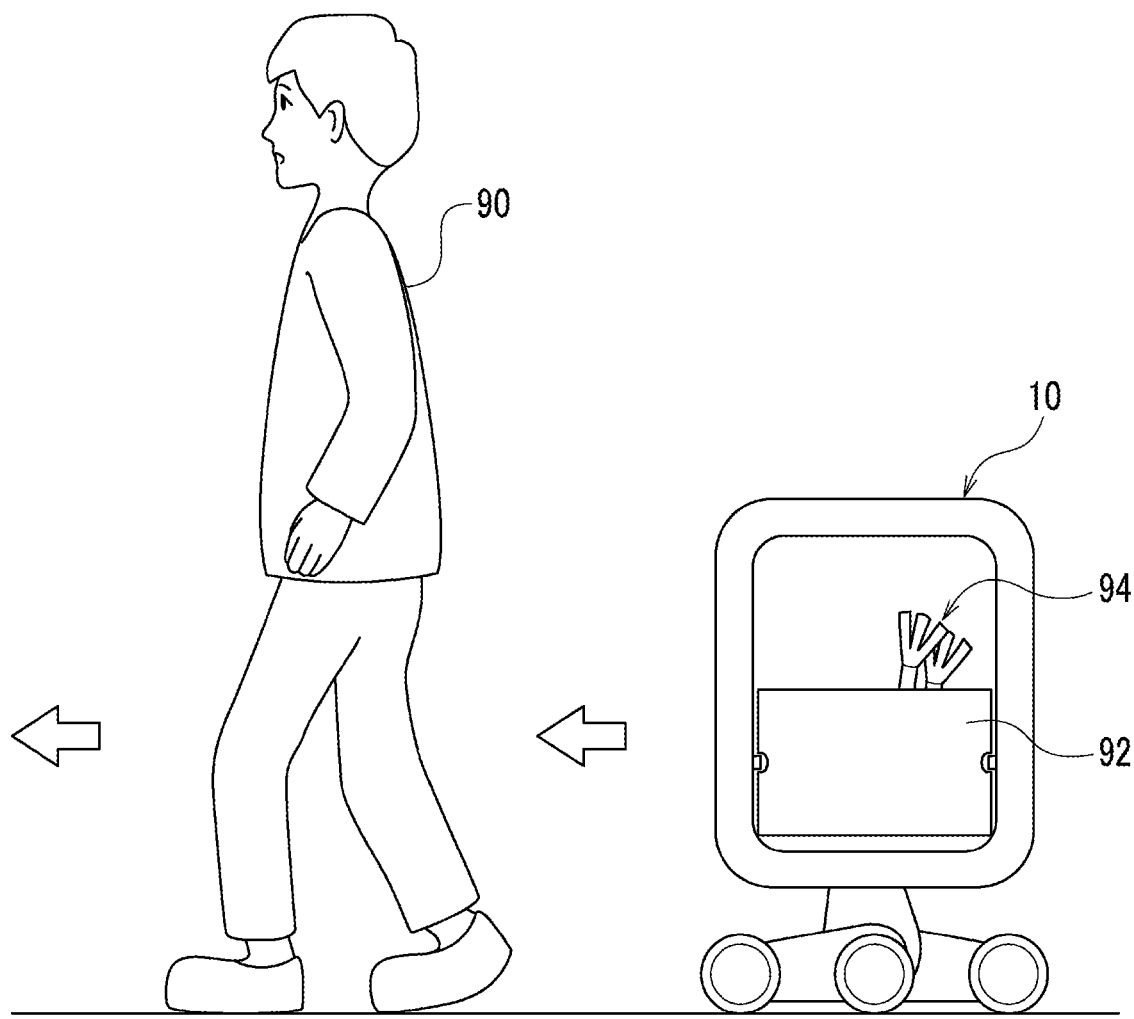
FIG. 11 is a diagram illustrating an operation of a package transport robot according to a second embodiment.

FIG. 11 is a diagram illustrating an operation of a package transport robot 10 according to a second embodiment. FIG. 11 shows a state in which the package transport robot 10 is being performed in the shopping support action mode, is located behind a user 90, and follows the user 90 according to the movement of the user 90. The user 90 uses the package transport robot 10 at a shopping center, and the package transport robot 10 holds a package 94 of the user 90 in a box 92 and follows the user 90 about 50 cm away.

When the user 90 is recognized by the package transport robot 10 and the use registration is completed, the package transport robot 10 performs a shopping support action mode in which the package transport robot 10 follows the user 90. In the shopping support action mode, the package transport robot 10 travels to maintain a predetermined following distance from the registered user 90.

Further, the package transport robot 10 may have a product settlement function, and may execute a purchase payment process when a product ID is acquired. For example, when the user 90 puts the product in the box 92 and a communication unit 52 receives a product ID from an IC tag of the product by near-field communication, the purchase payment process may be executed. In this way, the package transport robot 10 can support the user 90 to make a purchase.

Figure 12:
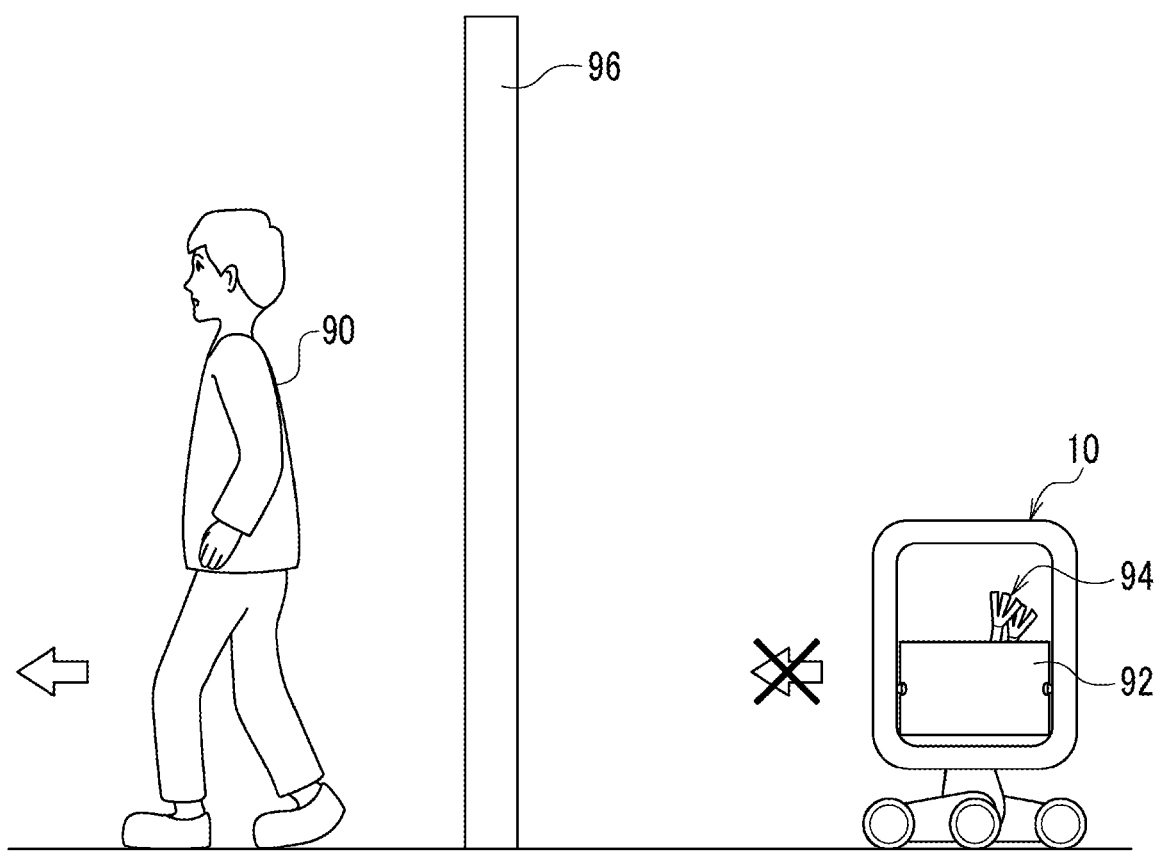
FIG. 12 is a diagram illustrating another operation of the package transport robot according to the second embodiment.

FIG. 12 is a diagram illustrating another operation of the package transport robot 10 according to the second embodiment. FIG. 12 shows a situation where the user 90 has dropped into a store from an entrance 96. Here, in the shopping support action mode, the package transport robot 10 follows the user 90, but depending on the location where the user 90 is located, it may be better to make the distance from the user 90 more distant. For example, when the package transport robot 10 enters a narrow store with the user 90, it is likely that the package transport robot 10 will be in the way. In some cases, the package transport robot 10 having fresh foods may not enter another store. Therefore, the package transport robot 10 is largely separated from the user 90 according to the type of package of the user 90 and the position of the user 90.

In FIG. 12, the package transport robot 10 waits in front of the entrance 96 such that the package transport robot 10 does not enter the store through the entrance 96. As described above, even when the package transport robot 10 is being executed in the shopping support action mode, the package transport robot 10 does not perform following at the predetermined following distance. Accordingly, the package transport robot 10 can take a distance according to the situation of the user 90.

Figure 13:
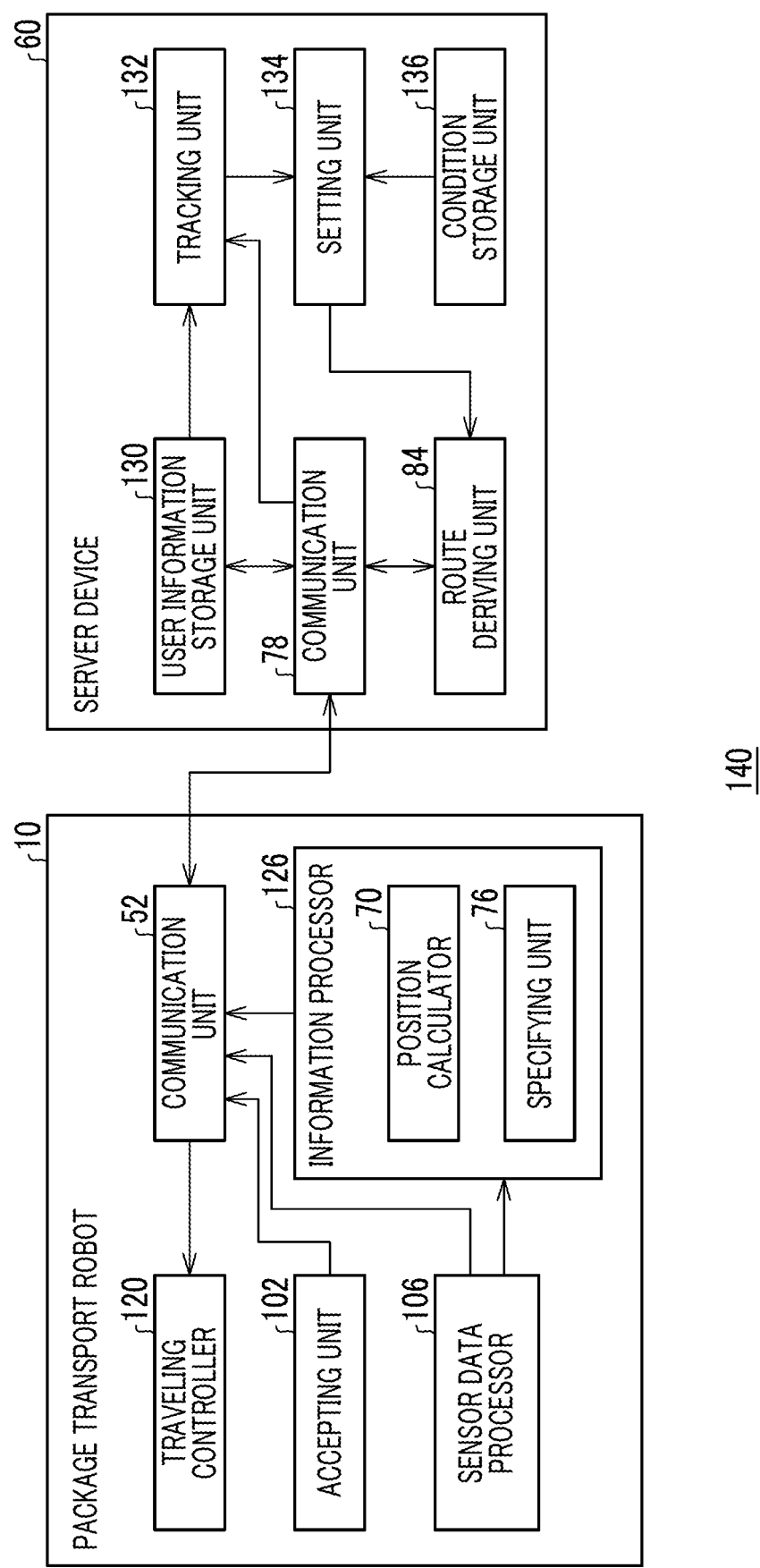
FIG. 13 is a diagram illustrating functional blocks of a robot control system according to the second embodiment.

FIG. 13 shows functional blocks of a robot control system 140 of the second embodiment. The server device 60 includes the communication unit 78, the route deriving unit 84, the user information storage unit 130, a tracking unit 132, the setting unit 134, and a condition storage unit 136.

The accepting unit 102 of the transport robot 10 accepts a use request in the shopping support action mode, and the sensor data processor 106 transmits an image of the user to be followed by the transport robot 10 through the communication unit 52.

The sensor data processor 106 analyzes the image of the received package 94 in the box 92, and sends the analysis result to the information processor 126. A specifying unit 76 of the information processor 126 specifies the package 94 based on the analysis result by the sensor data processor 106, and transmits information on the specified package 94 to the server device 60 through the communication unit 52. The position calculator 70 calculates the position information of the transport robot 10 and transmits the position information to the server device 60 through the communication unit 52.

The traveling controller 120 causes the transport robot 10 to travel to follow the user at a predetermined following distance. The traveling controller 120 may control the transport robot 10 to approach the user when the distance between the user and the transport robot 10 is equal to or longer than a predetermined following distance.

The communication unit 78 of the server device 60 receives the captured image of the camera 50, the position information of the transport robot 10, the user image to be tracked, and the robot ID from the transport robot 10. The user information storage unit 130 stores the user image to be followed. The user information storage unit 130 may store a feature amount generated based on the user image. That is, the user information storage unit 130 stores information about the user to be tracked.

The tracking unit 132 tracks a user to be followed based on an image captured by the transport robot 10 and an image captured by a fixed camera (not shown) located around the transport robot 10. The fixed camera located around the transport robot 10 may be, for example, a monitoring camera provided in a commercial facility. The tracking unit 132 searches for a target image similar to the user image stored in the user information storage unit 130 from the captured image, and tracks the searched target image.

The tracking unit 132 derives the position information of the user based on the position where the image is captured and the capturing direction. In addition, the tracking unit 132 may analyze the captured image to derive situation information around the user. The surrounding situation information of the user may be the size of the space where the user is, the degree of congestion of crowd in the space where the user is, or the type of store where the user enters. The surrounding situation of the user can be grasped from the position information of the user and information on the surrounding situation of the user. In addition, the tracking unit 132 may acquire the position information of the user from the mobile terminal of the user and track the user.

The setting unit 134 sets a following distance between the user and the transport robot 10 according to the type of package of the user or surrounding situations of the user. The setting unit 134 sets the following distance based on the following condition of the following distance stored in a condition storage unit 136. According to the following conditions stored in the condition storage unit 136, the relationship between the following distance of the user to the transport robot 10 and the surrounding situation of the user, and the relationship between the following distance of the user to the transport robot 10 and the type of package of the user are determined.

For example, when the user is in a narrow store, the following distance is set apart from the user such that the transport robot 10 does not enter the store. In addition, when the user is in a store that sells a product of a type completely different from the type of package of the user, a following distance away from the user is set. For example, when the package of the user contains fresh food and the user enters a clothing store, a following distance away from the user is set.

The route deriving unit 84 derives a movement route of the transport robot 10 such that the transport robot 10 follows the user at the following distance set by the setting unit 134, and sends the derived movement route to the transport robot 10. The movement route may be derived when the transport robot 10 cannot detect a user. The traveling controller 120 causes the transport robot 10 to travel along the derived movement route.

The route deriving unit 84 may derive the target position of the transport robot 10 such that the transport robot 10 follows the user at the following distance set by the setting unit 134. The traveling controller 120 causes the transport robot 10 to travel to the derived target position. As described above, the traveling controller 120 can control the traveling of the transport robot 10 to follow the user at the following distance set by the setting unit 134.

The route deriving unit 84 may derive a target position at which the transport robot 10 waits such that the transport robot 10 does not enter the store where the user has entered. A store in which the transport robot 10 is prohibited from entering the store may be determined in advance. For example, when the user enters a restaurant or movie theater, the route deriving unit 84 may derive a target position at which the transport robot 10 waits around the entrance of the restaurant or movie theater such that the transport robot 10 does not enter the restaurant or movie theater.

The transport robot 10 may carry the received package 94 to a predetermined housing position. For example, when the user enters a restaurant or movie theater, the transport robot 10 may carry the package 94 to the car or locker of the user.

Third Embodiment

Figure 14:
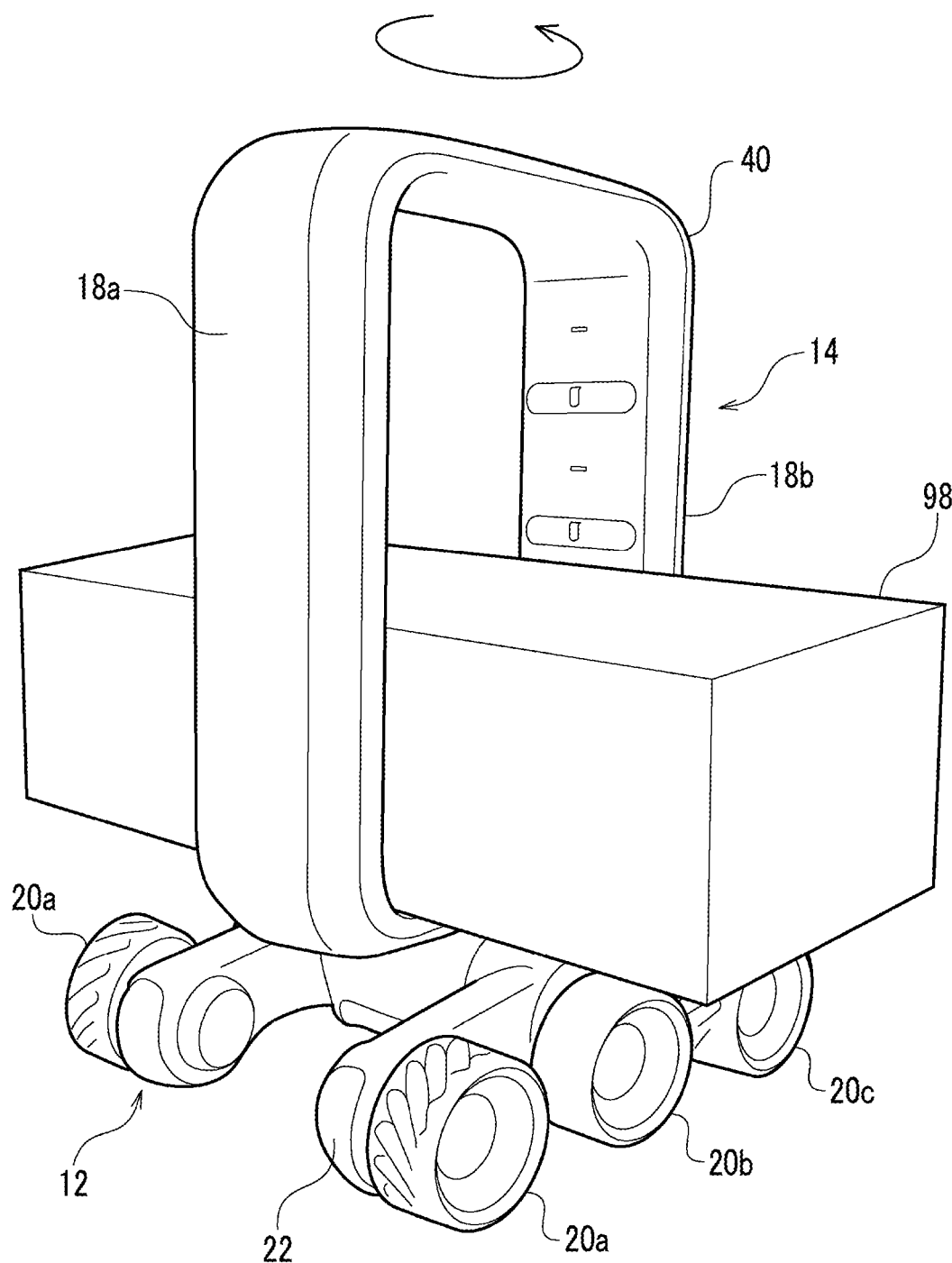
FIG. 14 is a diagram illustrating a robot control system according to a third embodiment.

FIG. 14 is a diagram illustrating a robot control system 150 according to a third embodiment.

FIG. 14 shows a state in which the transport robot 10 is holding a package 98. The package 98 is being held to protrude out from the opening of a frame body 40.

The transport robot 10 shown in FIG. 14 is at a rotation position of the frame body 40 in which the opening direction of the frame body 40 is parallel to the right-left direction of the traveling mechanism 12, that is, in a state in which the right side wall 18a and the left side wall 18b face each other in the front-rear direction of the traveling mechanism 12. Accordingly, even when the inertial force due to the forward and backward movement of the transport robot 10 is applied to the package 98, since the right side wall 18a and the left side wall 18b can get the package, the possibility of the package 98 falling out of the frame body 40 can be reduced.

In a state where the opening direction of the frame body 40 crosses the front-rear direction of the traveling mechanism 12, the package 98 protrudes out to the right and left from the traveling mechanism 12. When the package 98 is longer than the width of the traveling mechanism 12 in the right-left direction, the possibility that the protruding portion of the package 98 collides with an obstacle during traveling increases.

Therefore, when the package 98 protrudes out in the right-left direction of the traveling mechanism 12 and there is an obstacle in the traveling direction, the transport robot 10 rotates the frame body 40 around the vertical axis to avoid collision of the package 98 with the obstacle.

Returning to FIG. 6, description will be continued. The sensor data processor 106 detects an obstacle in the traveling direction of the transport robot 10 based on the detection results of the object detection sensor 34 and the camera 50. For example, the obstacle is a guardrail, a telephone pole, a person, a vehicle, or the like.

Further, the sensor data processor 106 analyzes the images captured by the cameras 50, detects that the package 98 is longer than the width of the traveling mechanism 12 in the right-left direction, and calculates the amount of protrusion of the package 98 in the horizontal direction. The amount of protrusion of the package 98 in the horizontal direction is a length that protrudes beyond the width of the traveling mechanism 12 in the right-left direction.

The information processor 126 determines whether or not the protruding portion of the package 98 collides with an obstacle due to the traveling of the transport robot 10. When determination is made that the package 98 collides with the obstacle, the movement controller 122 drives the rotary actuator 44 to rotate the frame body 40 such that the opening direction of the frame body 40 follows the traveling direction of the transport robot 10. Accordingly, the package 98 does not protrude out from the transport robot 10 to the left or right, thereby making it possible to avoid an obstacle.

The traveling controller 120 may lower the traveling speed when the opening direction of the frame body 40 is set to follow the traveling direction of the transport robot 10 to avoid obstacles, as compared with when the opening direction of the frame body 40 is orthogonal to the traveling direction of the transport robot 10. Accordingly, the possibility that the package 98 falls out of the frame body 40 while the transport robot 10 is traveling can be reduced.

When the obstacle is on the right of the transport robot 10, the movement controller 122 may rotate the frame body 40 clockwise when viewed from the above. In addition, when the obstacle is on the left of the transport robot 10, the movement controller 122 may rotate the frame body 40 counterclockwise when viewed from the above. In this way, when the obstacle is moving toward the transport robot 10, it is possible to increase the possibility of avoiding a collision.

The movement controller 122 may bring the transport robot 10 into the upright standing position when the package 98 can avoid an obstacle by bringing the transport robot 10 into the upright standing position.

It should be noted that the embodiments are merely examples, and it is understood by those skilled in the art that various modifications can be made to the combination of the components, and that such modifications are also within the scope of the disclosure.

What is claimed is:

1. A robot utilization system that uses a plurality of transport robots, each of the plurality of transport robots comprising:
    a traveling mechanism including wheels configured to have a traveling function;
    a main body supported by the traveling mechanism and configured to receive products; and
    an information processor configured to specify the products received by the main body, wherein
    the plurality of transport robots includes a first transport robot configured to perform purchase process on a product to be purchased received by the main body and a second transport robot configured to perform a return process on a product to be returned received by the main body, and
    during the return process, the information processor transmits a product ID of the product to be returned to a server, causes the server to execute a return process and receives a result of the return process from the server, wherein
    upon the product IDs of products received by the main body in the first transport robot satisfying a predetermined condition, the second transport robot approaches the first transport robot.

2. The robot utilization system according to claim 1, wherein:
    the second transport robot that is configured to perform the return process moves around in a facility that sells the products.

3. The robot utilization system according to claim 1, wherein
    the predetermined condition is satisfied when a plurality of the product IDs is detected and the detected product IDs are the same as each other.

* * * * *